W. J. GRIFFITH.
EXHAUST MUFFLER.
APPLICATION FILED MAY 11, 1912.

1,055,270.

Patented Mar. 4, 1913.

WITNESSES,
Richard Alepas.
Hector Leslie

INVENTOR.
WILLIAM J. GRIFFITH
By Charles E. Wiener
Attorney.

UNITED STATES PATENT OFFICE.

WILLIAM J. GRIFFITH, OF PLYMOUTH, MICHIGAN.

EXHAUST-MUFFLER.

1,055,270.  Specification of Letters Patent.  Patented Mar. 4, 1913.

Application filed May 11, 1912. Serial No. 696,713.

*To all whom it may concern:*

Be it known that I, WILLIAM J. GRIFFITH, a citizen of the United States, residing at Plymouth, county of Wayne, State of Michigan, have invented a certain new and useful Improvement in Exhaust-Mufflers, and declare the following to be a full, clear, and exact description of the same, such as will enable others skilled in the art to which it pertains to make and use the same, reference being had to the accompanying drawings, which form a part of this specification.

This invention relates to exhaust mufflers and an object thereof is a muffler that is simple and durable in construction, inexpensive to manufacture and efficient in operation.

A further object is a device of the character stated in which little or no back pressure is developed in operation.

A further object is an exhaust muffler whose capacity automatically alters in accordance with the needs of the engine to which it may be attached.

The means by which these objects may be accomplished and the various novel features of construction are hereinafter more fully described and claimed and shown in the accompanying drawings in which—

Figure 1:
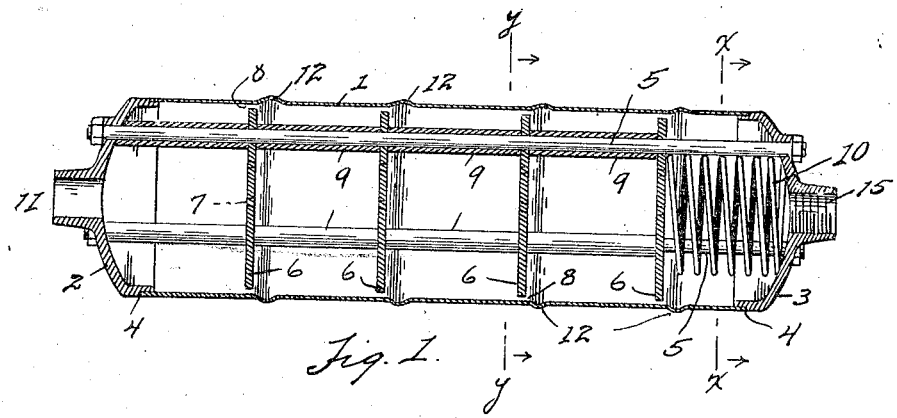
Figure 2:
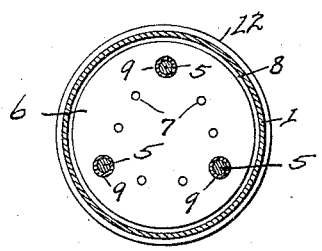
Figure 3:
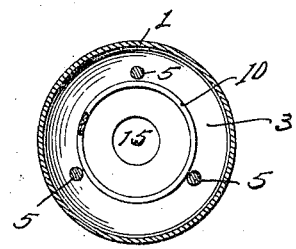

Figure 1 is a vertical longitudinal section of a muffler embodying my invention. Fig. 2 is a section on line $y$—$y$ of Fig. 1. Fig. 3 is a section on line $x$—$x$ of Fig. 1.

Similar characters refer to similar parts throughout the drawings and specification.

The device is preferably formed of a cylindrical shell 1 in opposite ends of which are heads 2, 3. The shell is preferably formed of sheet metal and the heads are preferably of cast-metal and provided with an annular seat 4 for the ends of the shell 1. The three parts are fastened in their proper relation by the rods 5, 5, 5 passing longitudinally through the shell and provided with nuts upon each end thereof engaging the heads. Mounted upon the rods and in substantially equidistant relation are a series of baffle plates 6, 6, 6, etc., provided with apertures through which the rods pass and also having a series of apertures 7 forming passageways for exhaust gas and, as also may be seen in the drawings, the diameter of the plates is less than the general diameter of the shell providing a passageway 8 between the edge of each plate and the shell.

The plates are held in their proper relation on the rods 5 by means of short pieces of tubing 9, 9, etc., slidable on the rods and there is a spacing tube between each of the plates and between the first of the series of plates and one of the heads, but no spacer is provided between the last of the series of plates and the head contiguous thereto, and between said last mentioned plate and the contiguous head is placed a coil-spring 10 normally forcing the plates toward the intake end 11 of the muffler, which is apertured in the ordinary manner for the reception of the exhaust tubing of the engine.

If the engine be running under a light load and at slow speed the plates will usually remain in their normal position under the action of the spring, and if the engine speed be increased, whereby the quantity of gas discharged is greatly increased, the pressure developed forces the entire series of plates toward the exhaust end 3 of the muffler and in so doing the plates 6 approach and may eventually come into alinement with the annular groove 12 formed in the shell, at which point the shell is greater in diameter and whereby greater space is provided between the edge of each plate and the shell which increases the size of the passageway for the exhaust gas as may be demanded by the engine. As the engine speed decreases and the amount of gas delivered to the muffler correspondingly decreases, the plates again assume their normal position under the action of the spring. The head at the exhaust end of a muffler is apertured at 15 and preferably threaded for the reception of the short piece of tubing usually used therewith.

While I have shown a single spring 10 by means of which the plates are held in their normal position, it is to be understood that a spring may be placed on each of the rods shown to perform the same function and that various other alterations in the general construction of the device may be made without departing from the spirit of this invention.

What I claim and desire to secure by Letters Patent of the United States is—

1. An exhaust-muffler comprising an imperforate cylindrical shell, heads therefor provided with an annular seat for the shell and having apertures forming an inlet and outlet for the shell, rods passing longitudinally through the shell for holding the heads and the shell in their relative position, baffle plates slidable on the rods, said plates being less in diameter than the shell, and means for yieldingly holding the plates in their normal position.

2. An exhaust muffler comprising a cylindrical shell, apertured heads therefor having an annular seat for the shell, rods passing longitudinally through the shell for holding the shell and heads in their proper relation, baffle plates on the rods, spacers on the rods for holding the plates in equidistant relation, the plates being less in diameter than the shell and said shell having an annular portion contiguous to each plate greater in diameter than the general diameter of the shell, and means for yieldingly holding the plates in their normal position.

3. An exhaust muffler comprising a cylindrical shell provided with circumferential grooves, apertured heads for the shell, rods passing longitudinally through the shell for maintaining the heads and the shell in fixed relation, a baffle plate slidably mounted on the rods normally positioned to one side of each groove, said plates being less in diameter than the shell, and yieldable means for holding the plates in their normal position.

4. An exhaust muffler comprising a cylindrical shell, an apertured head in each end of the shell provided with an annular seat therefor, rods passing longitudinally through the shell for binding the heads and the shell together, apertured plates slidable on the rods, said plates being less in diameter than the shell, yieldable means for holding the plates in their normal position, the arrangement of parts being such that movement of the plates from their normal position increases the unrestricted area within the shell.

5. An exhaust muffler comprising a cylindrical shell having circumferential grooves, an apertured head at each end of the shell having an annular seat therefor, rods passing longitudinally through the shell for binding the shell and the heads together, apertured baffle plates slidably mounted on the rods normally positioned to one side of the plane of the grooves, spacers on the rods for holding the plates in their relative position, the diameter of the plates being less than the diameter of the shell, and a spring for holding the plates in their normal position.

In testimony whereof, I sign this specification in the presence of two witnesses.

WILLIAM J. GRIFFITH.

Witnesses:
CHARLES E. WISNER,
SELENE McDONALD.